April 30, 1940. C. F. HENNEY 2,199,341
REFRIGERATING APPARATUS
Filed Jan. 21, 1936
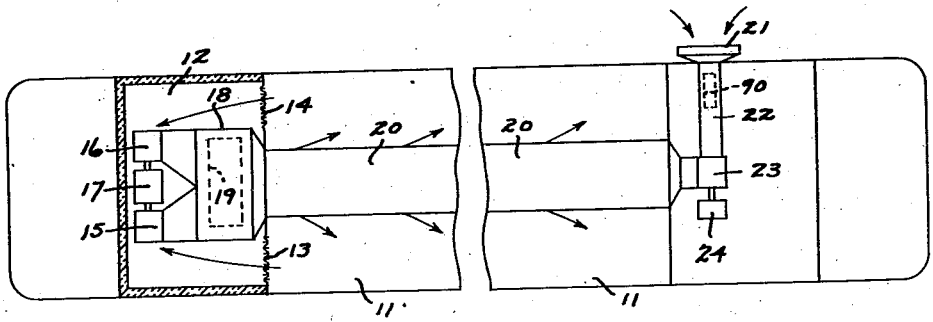
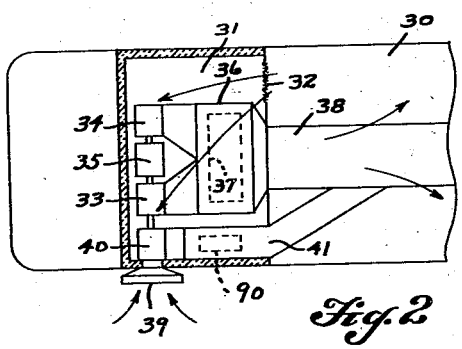
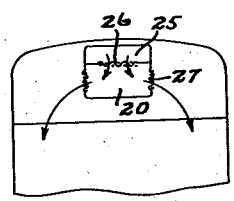
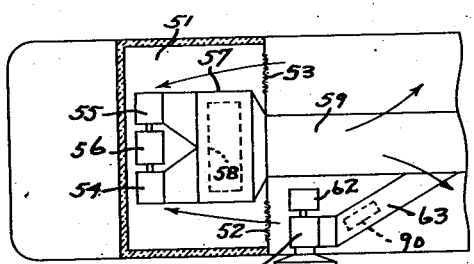
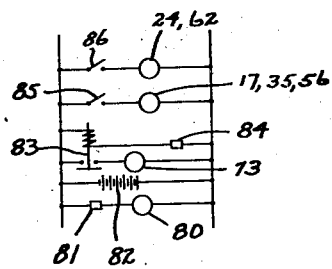
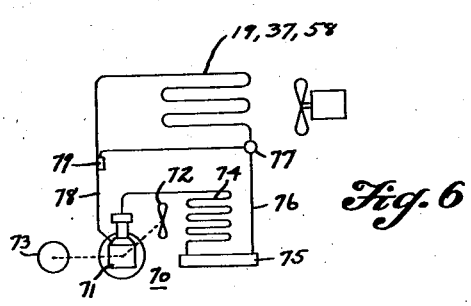
INVENTOR.
Charles F. Henney,
BY
ATTORNEYS Patented Apr. 30, 1940

2,199,341

UNITED STATES PATENT OFFICE 2,199,341

REFRIGERATING APPARATUS

Charles F. Henney, Dayton, Ohio, assignor to General Motors Corporation, Dayton, Ohio, a corporation of Delaware Application January 21, 1936, Serial No. 60,089

3 Claims. (Cl. 98—10)

This invention relates to refrigeration.

An object of this invention is to provide an improved system of conditioning air for railway cars or the like.

Further objects and advantages of the present invention will be apparent from the following description, reference being had to the accompanying drawing, wherein a preferred form of the present invention is clearly shown.

In the drawing:

Fig. 1 is a diagrammatic plan view of a railway car embodying features of my invention;

Fig. 2 is a diagrammatic plan view of a slightly modified form;

Fig. 3 is a diagrammatic plan view of another modified form;

Fig. 4 is a view transverse to Figs. 1, 2 or 3;

Fig. 5 is a diagrammatic showing of a refrigerating system which may be combined with any of the modifications; and Fig. 6 is a wiring diagram to indicate the manner of control.

In practicing this invention, the air within the car is recirculated and reconditioned by flowing air from the passenger space into the air conditioning zone and thereafter discharging the conditioned air over the passenger space. Uncooled fresh air is distributed along with the reconditioned recirculated air so that it tempers the cooled air and also insulates it from the hot roof structure.

To this end a railway car having passenger compartment 11 is provided with a conditioning compartment or cooling zone 12 placed at one end of the car and above the level of the normal head room in compartment 11. The compartment 12 is provided with recirculated air inlets 13 and 14 so that recirculated air from the compartment 11 enters the compartment 12. Blowers 15 and 16 are driven by a motor 17 in such a manner that air from the compartment 12 is forced through the casing 18, having an evaporator or cooling means 19, and is discharged through an overhead duct or distributing means 20 into the compartment 11. Fresh air is filtered at 21 and is drawn through the conduit 22 to the blower 23 driven by the motor 24. This uncooled fresh air is forced through the conduit 25 over the conduit 20. A continuous opening or an intermittent set of openings 26 is interposed between the conduits 25 and 20 so that the uncooled fresh air is distributed along and into the conduit 20 where it tempers the cooled air and from whence it is discharged with the cooled recirculated air through the openings 27 along the sides of the conduit 20.

In the modification shown in Fig. 2, the car is provided with passenger compartment 30 and an air conditioning compartment 31 placed above the level of the normal head room in compartment 30. Air from the compartment 30 flows through the inlet 32 into the compartment 31 and into the blowers 33 and 34 driven by the motor 35. This air is forced through the casing 36 provided with the evaporator 37 and is forced into the conduit 38 along the upper portion of the passenger compartment 30. Fresh air is filtered at 39 and is blown by the blower 40 through the conduit 41 into a conduit above the conduit 38, the two conduits being combined in a manner similar to that indicated in Fig. 4, it being understood that the air from conduit 41 flows into the conduit corresponding to 25 and air from 38 flows through the conduit corresponding to 20.

In the modification shown in Fig. 3, the car is provided with a passenger compartment and an air conditioning compartment 51 placed over the level of the head room in the passenger compartment. Recirculated air enters through the inlets 52 and 53 into the compartment 51 and into the blowers 54 and 55 driven by the motor 56. From thence it is forced through casing 57 provided with an evaporator or cooler 58 and is discharged into the conduit 59. Fresh air is filtered at 60 and passes into the blower 61 driven by the motor 62 and is discharged through conduit 63 above the conduit 59, the two conduits merging into the structure similar to that shown in Fig. 4, it being understood that conduit 63 discharges into the upper conduit corresponding to 25 and the conduit 59 discharges into the lower conduit corresponding to 20.

The evaporators or air cooling devices 19, 37 and 58 form part of a refrigerating system which may take the form indicated in Fig. 6. Thus a refrigerant liquefying unit 70 may include a compressor 71 and condenser fan 72 driven by motor 73. The compressor 71 discharges into the condenser 74 having a receiver 75. Liquid refrigerant flows through the line 76 past the automatic expansion valve 77 into the evaporator 19, 37 or 58 and in turn through the suction line 78 to the compressor 71. The expansion valve 77 is of the type which automatically opens when the pressure therein is reduced below a predetermined limit and is automatically throttled by a bulb 79 whenever the refrigerating effect reaches the suction line 78.

The refrigerating system may be automatically controlled as indicated in Fig. 5. Thus a generator 80 is driven from the axle of the car and is provided with an automatic cut-out 81 which automatically disconnects the generator when the speed of the car falls below a predetermined limit. The generator 80 is provided with suitable voltage regulators to charge the battery 82 properly at all permissible car speeds. The compressor motor 73 is controlled by a relay 83 under the control of thermostat 84 so that the motor starts whenever the temperature in the compartments 11, 30 or 50 rises above a predetermined temperature and so that the motor stops whenever the temperature falls below a predetermined limit. The motors 17, 35, 56 and 23 may be provided with individual manual switches 86, 85, etc., so that they operate continuously as long as refrigeration or air conditioning of any type is desired.

In each of the fresh air conduits a steam heating coil 90 may be provided, and, if desired, the steam thereto may be controlled by a thermostat placed in the passenger compartment.

While the form of embodiment of the invention as herein disclosed, constitutes a preferred form, it is to be understood that other forms might be adopted, all coming within the scope of the claims which follow.

What is claimed is as follows:

1. A vehicle having a passenger compartment, means for cooling air, said means having an intake connected to said compartment and a distributing means along the upper part of said compartment, and means for mixing uncooled fresh air with the air in said distributing means, said last named means including a fresh air conduit above and discharging into said distributing means.

2. A vehicle having a passenger compartment, means for cooling air, said means having an intake connected to said compartment and a distributing means along the upper part of said compartment, and means for mixing uncooled air with the air in said distributing means, said distributing means comprising two parallel ducts having communicating openings and one of said ducts having openings leading to said compartment.

3. In an air conditioning system, two ducts having a common apertured wall, means for flowing fresh air in the one duct, means for flowing conditioned air in the other duct and openings in the one duct constituting the sole means of escape from the ducts.

CHARLES F. HENNEY.